United States Patent [19]

Lev et al.

[11] Patent Number: 5,483,524
[45] Date of Patent: Jan. 9, 1996

[54] METHOD FOR TRANSMITTING DATA PACKETS VIA A CIRCUIT-SWITCHED CHANNEL

[76] Inventors: Valy Lev, 1548 Rachel La.; Rod Averbuch, 874 Shambliss La.; Israel A. Cimet, 891 Silver Rock La., all of Buffalo Grove, Ill. 60089

[21] Appl. No.: 239,489

[22] Filed: May 9, 1994

[51] Int. Cl.$^6$ .................................................. H04L 12/56
[52] U.S. Cl. ........................................ 370/60.1; 370/94.1
[58] Field of Search ........................... 370/60, 60.1, 94.1, 370/94.2, 110.1, 16, 85.7, 85.13, 95.1, 94.3, 79; 340/825.03, 825.01, 827; 371/8.1, 8.2, 11.1, 11.2; 455/39, 68, 53.1, 54.1, 54.2, 55.1, 56.1

[56] References Cited

U.S. PATENT DOCUMENTS

| | | | |
|---|---|---|---|
| 5,042,030 | 8/1991 | Grima et al. | 370/16 |
| 5,119,370 | 6/1992 | Terry | 370/60.1 |
| 5,159,592 | 10/1992 | Perkins | 370/85.7 |
| 5,315,594 | 5/1994 | Noser | 370/110.1 |

Primary Examiner—Benedict V. Safourek
Assistant Examiner—Dang Ton
Attorney, Agent, or Firm—Christopher P. Moreno

[57] ABSTRACT

Data to be transmitted from an information source (301) associated with a local/wide area network (303) is formatted into a plurality of data packets. Each data packet includes a first target destination identifier that uniquely identifies a target destination (323) within an RF communication system (306). A network interfacer (305) establishes connectivity between the local/wide area network and a controller (307) associated with the RF communication system. Based on the first target destination identifier, the controller determines a second target destination identifier corresponding to the target destination. A circuit-switched channel is established to the target destination using the second target destination identifier. The data packets are then transmitted via the circuit-switched channel to the target destination without either the first or second target destination identifiers being transmitted therewith.

12 Claims, 3 Drawing Sheets

METHOD FOR TRANSMITTING DATA PACKETS VIA A CIRCUIT-SWITCHED CHANNEL

FIELD OF THE INVENTION

The present invention relates generally to communication systems and, in particular, to the transmission of data packets.

BACKGROUND OF THE INVENTION

There exists today a growing need to expand the use of traditionally office-based computer applications (e.g., word processing programs, electronic mail, etc.) to remote locations such as the home or car. Data files and/or messages generated by such applications, residing on hosts having local-area network/wide-area network (LAN/WAN) connectivity, are typically transmitted from one location to another using high-speed protocols such as the so-called Transport Control Protocol/Internet Protocol (TCP/IP). In order to extend the use of these applications to remote locations not serviced by a LAN/WAN, it is necessary to establish connections between LAN/WANs and other non-similar communication networks, such as wireless communication systems.

A major difficulty in connecting LAN/WANs to wireless communication systems is the large disparity in their available transmission bandwidths and hence, their throughput capacities. It is not atypical for a wireless communication system to have a transmission bandwidth 10 times less that of a LAN/WAN. This disparity also contributes to the widely differing protocols used in LAN/WANs and wireless communication systems. The lower throughput capacities associated with wireless communication systems has led to the use of circuit-switched techniques, whereas the higher throughput capacities associated with LAN/WANs has led to the use of packet-switched techniques.

FIG. 1 illustrates an example of a typical, prior art circuit-switched communication (100). When initial source data (101) becomes available, a channel set-up period (107) is required to establish a communication path between the source and the destination. For example, in the wireless case, the channel set-up period (107) may be the time required to request and obtain usage of a particular radio frequency (RF) carrier. Regardless of the channel type, the channel, once established, remains dedicated for the exclusive use of the source and destination.

Having established the channel, the initial source data is transmitted (109) to the destination. As additional source data (103, 105) becomes available, it is immediately transmitted (113, 117) through the channel. When necessary, usage of the channel is then discontinued during a channel tear-down period (119). Advantages of circuit-switched techniques are the low overhead requirement (i.e., the amount of throughput capacity required for the transmission of information other than the source data), as well as the low delay (i.e., the time difference between the availability of source data and its actual transmission). The periods of channel inactivity (111, 115) in between periods of data availability, however, are a disadvantage of circuit-switched techniques. This is a direct result of the dedicated use of the channel; other sources are unable to utilize the channel. These advantages and disadvantages make the use of circuit-switched techniques most efficient for longer communications, such as file transfers or fax transmissions.

FIG. 2 illustrates an example of a typical, prior art packet-switched communication (200). A key difference between packet-switched and circuit-switched methods is that the channel, when used in a packet-switched manner, is not dedicated and is available for use by multiple sources and destinations. Once available, the initial source data (101) is partitioned into data packets (203, 207, 211) for transmission. The data packets (203, 207, 211) occupy available time-slots that include capacity for overhead data (201, 205, 209). Due to the commonality of the channel, the overhead data (201, 205, 209) typically comprises target destination identification information so that data intended for a particular destination may be properly routed.

As additional source data (103, 105) becomes available, it is again formatted into data packets (217, 221, 227) and placed into available time-slots with their associated overhead data (215, 219, 225). Advantages of packet-switched methods are that set-up/tear-down periods are not required. Also, multiple communications may be intermingled on the channel. Assuming the use of channels having equivalent bandwidths, packet-switched methods are less efficient relative to circuit-switched methods due to the additional overhead, typically leading to larger throughput delays. Delays are further lengthened when time-slot availability is reduced due to heavy use of the channel. These disadvantages can be overcome by increasing the packet-switched channel's transmission bandwidth, if possible, to accommodate the larger overhead and need for additional time-slots. Typically, packet-switched techniques are most efficient in the transmission of shorter communications, such as electronic mail messages or paging services.

In order to establish connectivity between LAN/WANs and wireless communication systems, the incompatibilities of their respective packet-switched and circuit-switched protocols need to be resolved. One solution to this problem is to directly transmit the packet-switched data, including the overhead data for each packet, over a circuit-switched (i.e., wireless) channel. This is inadequate, however, because the differences in throughput capacities would require an inordinate amount of packet-switched information to be buffered prior to transmission over the circuit-switched channel. Even if the circuit-switched channel has sufficient bandwidth, this solution becomes inefficient due to channel inactivity during periods of low packet volumes.

Another solution is to establish a circuit-switched transmission for each data packet or group of data packets. While this solution might be acceptable for low volumes of packets, it becomes severely inefficient for increasing packet volumes due to the set-up and tear-down overhead Therefore, a need exists for a method of transmitting packet-switched data in an efficient manner over circuit-switched (particularly wireless) communication channels.

DESCRIPTION OF A PREFERRED EMBODIMENT

Generally, the present invention provides a method for transmitting packet-switched information to a target destination via a circuit-switched channel. This is accomplished by formatting the data to be transmitted into a plurality of data packets, which data packets each include a first target destination identifier. Based on the first target destination identifier, a second target destination identifier, corresponding to the target destination, is also determined. A circuit-switched channel is established to the target destination using the second target destination identifier. The data packets are then transmitted via the circuit-switched channel to the target destination without either the first or second target destination identifiers being transmitted therewith. Such a method allows information normally conveyed in a packet-switched manner, as well as information normally conveyed in a circuit-switched manner, to be efficiently transmitted over circuit-switched channels.

Figure 3:
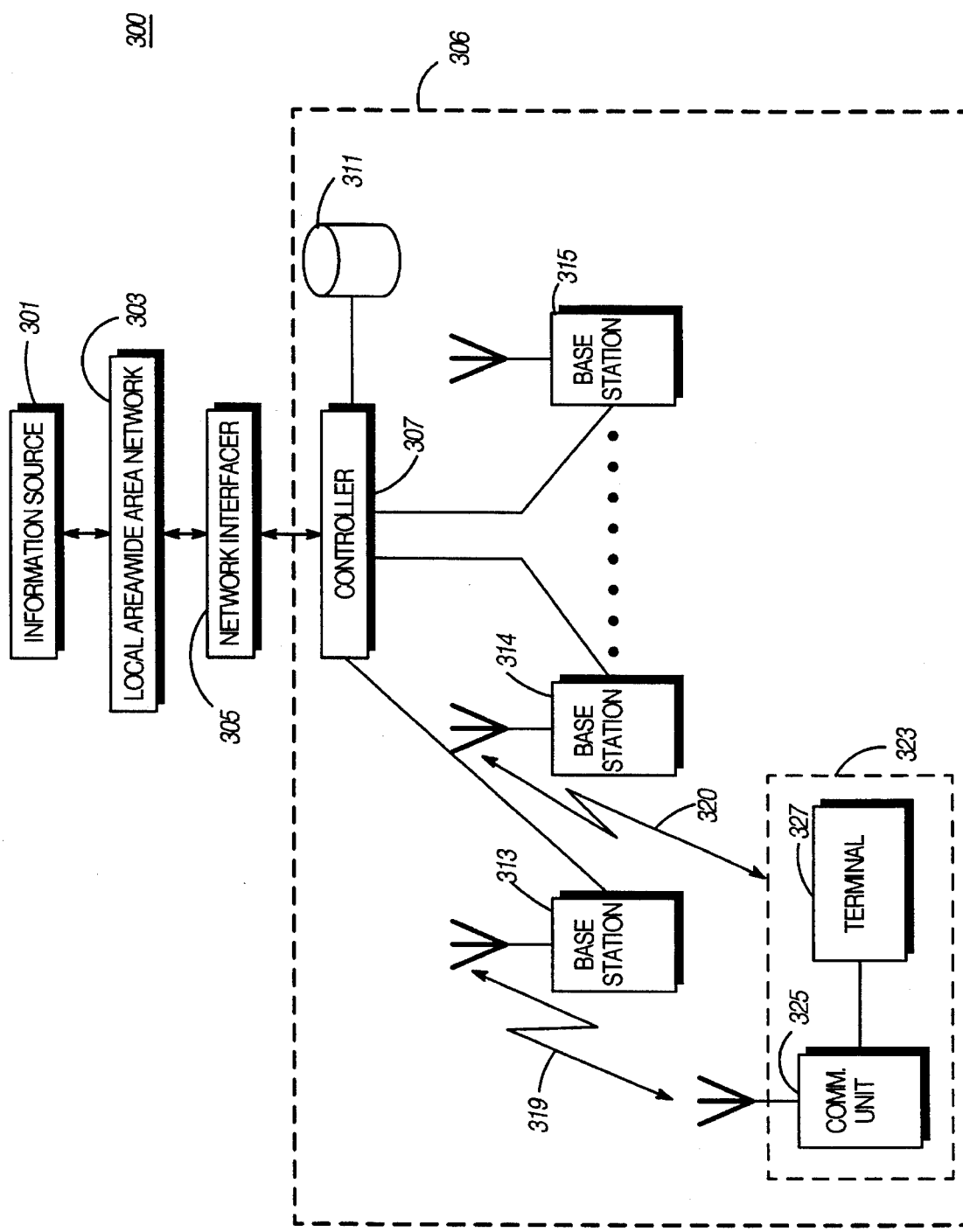
FIG. 3 illustrates a data network that includes a local/wide-area network and a wireless communication system in accordance with the present invention.

The present invention can be more fully described with reference to FIGS. 3–5. FIG. 3 illustrates a data network (300) that includes an information source (301), a local/wide area network (LAN/WAN) (303), a network interfacer (305), and a radio frequency (RF) communication system (306). The information source (301) may comprise an electronic mail or word processing application running on a personal computer (PC) or workstation. The LAN/WAN (303) may comprise a public or private data network such as ISDN (Integrated Services Digital Network), Frame Relay, or ATM (Asynchronous Transfer Mode) network. The network interfacer (305) may comprise a computer-based gateway between the LAN/WAN (303) and the RF communication system (306), which may comprise a dispatch cellular service, or a personal communication service (PCS) system.

The RF communication system (306) includes a controller (307), base stations (313–315), and at least one target destination (323). The target destination (323) comprises a communication unit (325), such as a Groupe Speciale Mobile (GSM) digital cellular telephone, or a MIRS™ dispatch radio, both by Motorola Inc., coupled to a data-capable terminal (327), such as a PC-based facsimile unit. Typically, as the target destination (323) travels within the RF communication system (306), communications can be established between the communication unit (325) and the base stations (313–315) via communication resources (319–320). In a preferred embodiment, the communication resources (319–320) comprise pairs of RF carriers. In addition to allocating the communication resources (319–320) when necessary, the controller (307) tracks the location of the communication unit (325). This location information is stored in a controller database (311) along with the operating characteristics of each communication unit. The database (311) is typically consulted when a call is received from or transmitted to the communication unit (325). The controller (307) and the database (311) may be a Mobile Switching Center (MSC) and a Home Location Register (HLR) by Northern Telecomm., Inc. When a communication to/from the information source (301) from/to the target destination (323) is desired, the network interfacer (305) provides connectivity between the LAN/WAN (303) and the controller (307).

The network interfacer (305) provides a link between LAN/WAN (303) and the RF communication system (306) thereby allowing communications to occur between the information source (301) and the target destination (323). The network interfacer may be a group of modems providing multiple access paths to the public switched telephone network (PSTN), or it may be a packet gateway/router that incorporates many different protocols to communicate with public or private data networks.

Figure 4:
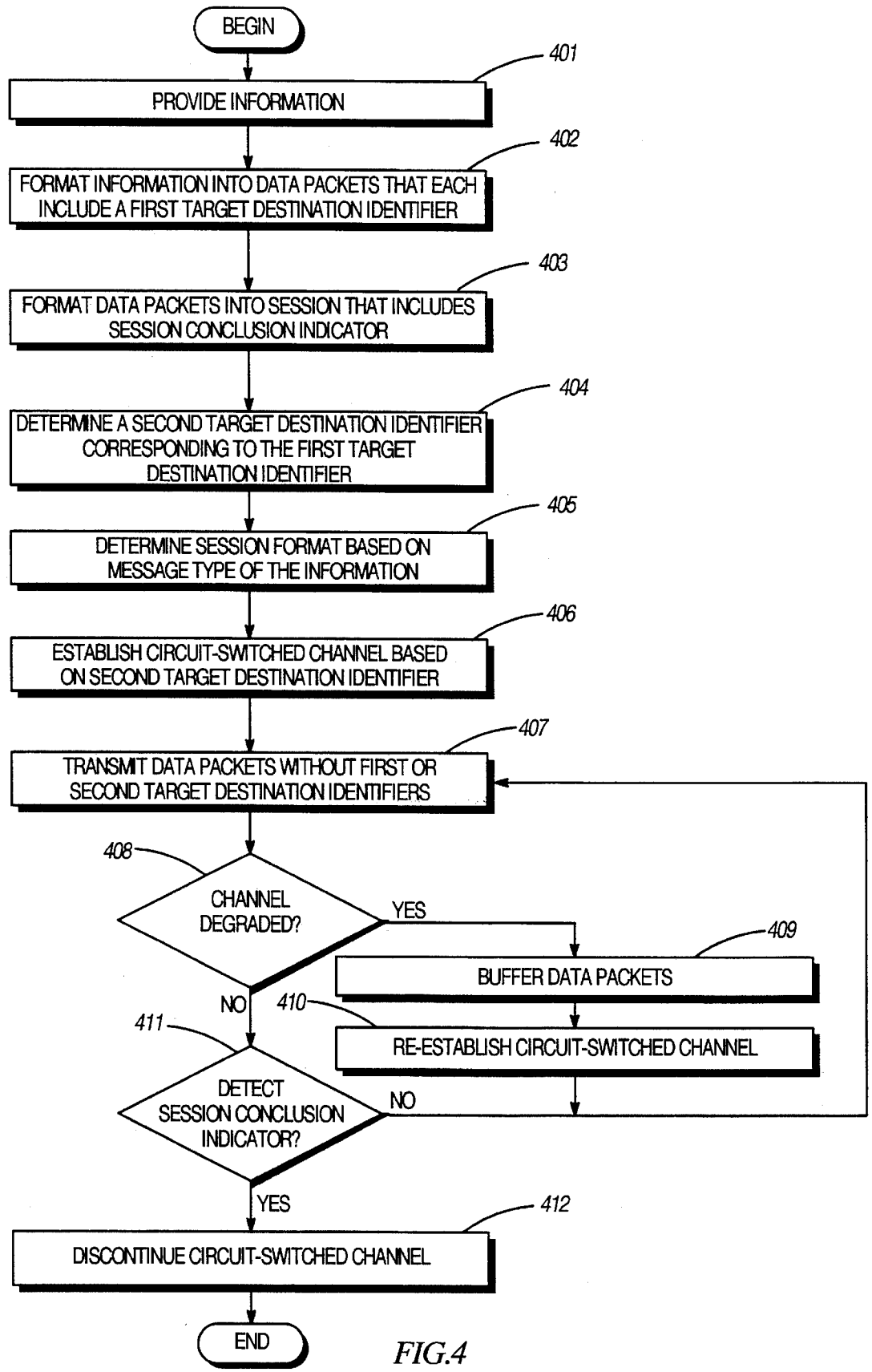
FIG. 4 illustrates a logic diagram which may be used by a data network when transmitting packet-switched information in accordance with the present invention.

FIG. 4 illustrates a logic diagram which may be used when transmitting information between the information source (301) and the target destination (323) in accordance with the present invention. The information transfer illustrated in FIG. 4 is hereinafter described in the context of an application using the TCP/IP protocol in a simplex manner (i.e., in one direction only). However, it is important to note that the process illustrated in FIG. 4 may also work for other protocols, such as the AppleTalk Transaction protocol, operating in a duplex manner, i.e., from the information source (301) to the target destination (323), and vice versa.

At step 401, it is assumed that information, intended for transmission to the target destination (323), is provided by an application operating at the information source (301). This information is in a digital form and may comprise a short electronic mail message or a long document file. The information source (301) formats the information into data packets (402). Each data packet includes a header that comprises a first target destination identifier, such as the IP address, for uniquely identifying the data-capable terminal (327).

Having produced the data packets, a session is then initiated from the information source (301) to the data-capable terminal (327) by further formatting the data packets into a session (403). The information source (301) opens a conventional TCP session having a session header, which session header includes the relevant TCP and IP information. The session header provides information on the type, characteristics and length of the session. Also, a session conclusion indicator may be included in the session. In sessions where a session conclusion indicator is not available, the type and/or characteristics of the session (i.e., the TCP port number) can be used to predict the session conclusion. It is important to note that the boundaries of the session (i.e., the session header and conclusion indicator) are used to control the set-up and tear-down of the communication path. After session formatting, the packets are forwarded to the LAN/WAN (303) which in turn utilizes the IP information to route the packets to the network interfacer (305).

Upon reception of the data packets and session header, the network interfacer (309) requests the controller (307) to establish a communication path to the communication unit (325) associated with the first target destination identifier and hence, the data-capable terminal (327). To this end, the controller (307) maps the first target destination identifier into a second target destination identifier (404), such as a telephone number of the communication unit (325), by consulting the controller's database (311).

Prior to establishing communications with the communication unit (325), the interfacer (309) determines the session format and type based on the message type. For example, if the TCP port number indicates that a message is of an electronic mail type, the interfacer (305) may determine that a particular type of session format has been used. Information about the session format is later used to detect conclusion of the session.

Using the second target destination identifier, i.e., a phone number, the controller (307) establishes a circuit-switched channel (406) to the communication unit (325). The circuit-switched channel is established by the controller (307) using well-known techniques of assigning a communication resource (319–320) to a base station (313–315). Prior to transmitting any information to the communication unit (325), the controller (307) checks availability of the communication unit (325) and presents this information to the network interfacer (305). In a preferred embodiment, the network interfacer (307) requests the WAN/LAN (303) to buffer the packets when the communication unit (325) is unavailable. Alternately, the network interfacer (305) may respond to the information source (301) with a TCP "open failure" message when the communication unit (325) is unavailable.

Assuming that the communication unit (325) is available, the network interfacer (305) forwards any data packets having the first target destination identification over the circuit-switched channel (407). Since the target destination is now uniquely determined by the circuit-switched channel, the first and second target destination identifiers are not transmitted with the data packets, thereby improving throughput capacity of the circuit-switched channel.

As is well known in the art, the RF communication system (306) continuously evaluates the condition of the circuit-switched channel during transmission of the data packets. As long as the circuit-switched channel is in good condition (i.e., reliable), the data packets are transmitted over the channel. When it is determined that the channel has degraded (408), due to fading or interference for instance, the communication unit (325) can use well-known protocols to re-establish the circuit-switched channel under a site having good signal conditions.

When it is determined that the channel has degraded (408), due to fading or interference for instance, the controller (307) buffers (409) any data packets received from the LAN/WAN (303) intended for the target destination (323). While the data packets are buffered (409), the communication unit (325) uses well-known techniques to re-establish (410) the circuit-switched channel under a site having better signal conditions. After the communication unit (325) re-establishes the circuit-switched channel (410), the controller (307) forwards any buffered data packets for transmission and returns to transmitting any incoming data packets (407).

When it is determined that the channel has not degraded (408), the network interfacer (309) determines if the session conclusion indicator has been detected (411). The session conclusion indicator may be included as part of the session or it may be inferred from the type and format of the session. For example, in a file transfer under a TCP/IP session, the first data packet of the session includes the maximum number of data packets to be transferred during that session. The network interfacer (309) counts the number of data packets received and, when the maximum number is reached, indicates that the entire file has been transmitted and, in this case, that the session conclusion indicator has been detected.

In another example, a UDP (User Datagram Protocol) trivial file transfer simply transmits blocks of data packets with session packets indicating the start and end of the block. The session format usually transmits blocks of a fixed length (e.g., 600 bytes). In this case, the network interfacer (305) checks the length of every block received. If the length is 600 bytes, then there is a higher probability that another block will be coming in the near future. Conversely, if a block is less than 600 bytes, it is highly probable that this block is the last one in the session and a session conclusion indicator is therefore detected by the network interfacer (309).

Regardless of the method used, when a session conclusion indicator is not detected (411), processing continues at step 407 as described previously. When a session conclusion indicator is detected (411), the network interfacer (305) requests the controller (307) to discontinue the circuit-switched channel. In this manner, the channel does not remain in use during periods of channel inactivity, and thus may be reassigned for other purposes. This is an advantage over prior art solutions in which no other usage of the channel was allowed due to the exclusive nature of the channel assignment. As previously discussed, it is understood that the procedure described above with reference to FIG. 4 may also be utilized to transmit information in the opposite direction, i.e., from the data-capable terminal (327) to a target destination affiliated with the LAN/WAN (303).

Figure 1:
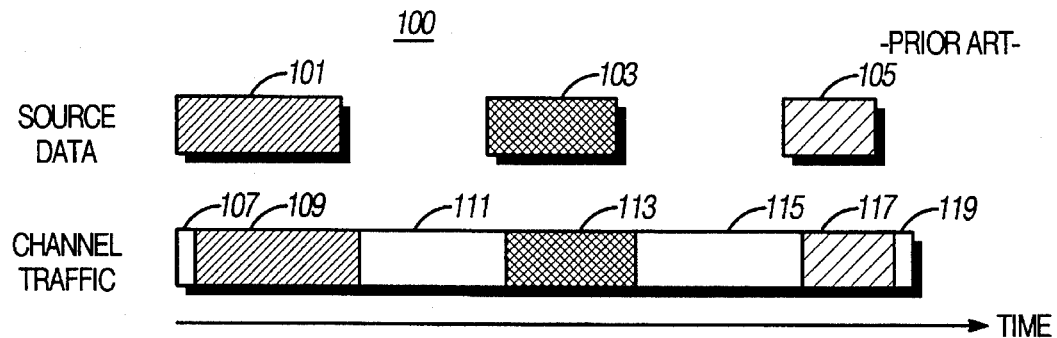
FIG. 1 illustrates a circuit-switched communication in accordance with prior art.
Figure 2:
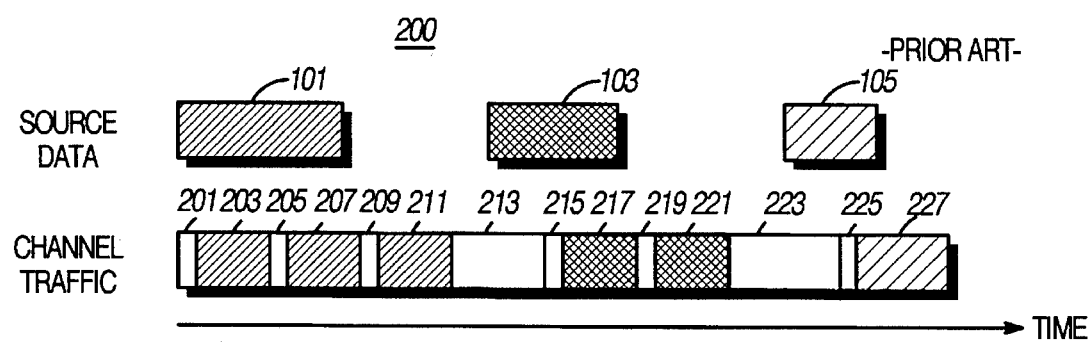
FIG. 2 illustrates a packet-switched communication in accordance with prior art.
Figure 5:
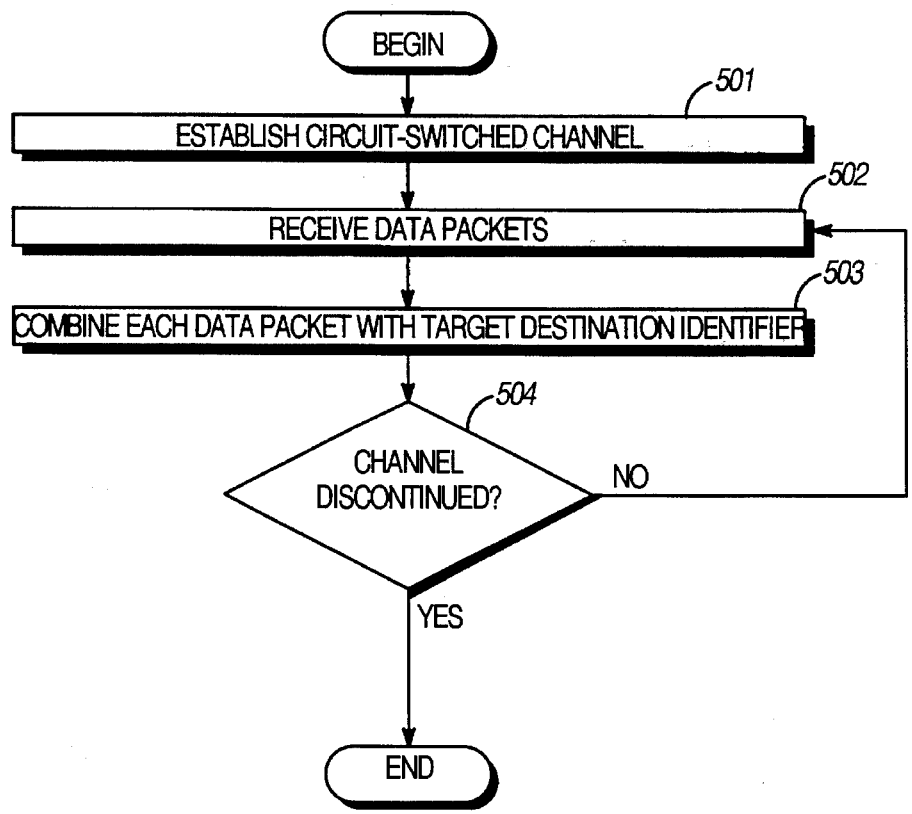
FIG. 5 illustrates a logic diagram which may be used by a target destination when receiving packet-switched information in accordance with the present invention.

FIG. 5 illustrates a logic diagram which may be used by the communication unit (323) when receiving information in accordance with the present invent ion. At step 501, the communication unit (323) receives notification of an incoming circuit-switched call and it establishes the RF channel. The communication unit (323) then receives the data packets (502) and recombines the first target destination identifier, as well as the TCP information, with the received data packets (503). The first target destination identifier, although not transmitted, can be recombined with the data packets since it is previously known by the communication unit (325). The TCP information, on the other hand, is available because it has been included with the initial session information. In this manner, the circuit-switched transmission process is transparent to the data-capable terminal (325) because data packets are presented to the data-capable terminal (327) with the first target destination identifier as they would be if received directly from the LAN/WAN (303). The communication unit (323) will continue delivering the data packets until it detects that the circuit-switched channel has been discontinued (504) by the network interfacer (305) and the controller (307).

The present invention provides a method for transmitting packet-switched information to a target destination via a circuit-switched channel. With such a method, the efficient transport of packet-switched data within a circuit-switched RF communication system is realized because the need to re-establish a circuit-switched channel for each data packet is eliminated. Additionally, the inefficiencies inherent to directly transmitting packet-switched data over a circuit-switched channel, such as undue buffering and reduced throughput capability, are overcome because the additional overhead associated with packet-switched data (as in the aforementioned first and second target destination identifiers) is not transmitted. The nature of a circuit-switched channel ensures that the data will be reliably routed to the correct destination. By observing the data session type and format, conclusion of a session may be reliably detected allowing communication channels to be discontinued, thereby avoiding channel inactivity. Also, by recombining the data packets with the appropriate packet-switched overhead (i.e., TCP/IP information), usage of the circuit-switched channel is transparent to the target destination.

We claim:
1. A method comprising the steps of:
 - providing information to be transmitted;
 - formatting the information into a plurality of data packets, wherein each data packet includes a first target destination identifier;

- determining a second target destination identifier that corresponds to the first target destination identifier;
- establishing an RF-based circuit switched channel to a target destination that corresponds to the second target destination identifier; and
- transmitting the data packets via the RF-based circuit switched channel without either the first target destination identifier or the second target destination identifier being transmitted therewith.

2. The method of claim 1, and further including the steps of:
- determining that the RF-based circuit switched channel is degrading;
- establishing a new RF-based circuit switched channel to the target destination; and
- using the new RF-based circuit switched channel, continuing to transmit the data packets without either the first target destination identifier or the second target destination identifier being transmitted therewith.

3. The method of claim 1, and further including the steps of:
- determining that the RF-based circuit switched channel is degrading;
- buffering data packets that have yet to be transmitted to the target destination;
- establishing a new RF-based circuit switched channel to the target destination; and
- using the new RF-based circuit switched channel, continuing to transmit the data packets, including the data packets that were buffered, without either the first target destination identifier or the second target destination identifier being transmitted therewith.

4. The method of claim 1, and further including the steps of:
- receiving the data packets at the target destination; and
- subsequent to reception of the data packets at the target destination, combining each of the data packets with the first target destination identifier.

5. A method comprising the steps of:
- providing information to be transmitted, which information comprises a message type of a plurality of message types;
- formatting the information into a plurality of data packets, wherein each data packet includes a first target destination identifier;
- formatting the plurality of data packets into at least one session, which session includes a session conclusion indicator;
- determining a second target destination identifier that corresponds to the first target destination identifier;
- determining the message type to identify which session format has been used to format the plurality of data packets;
- establishing an RF-based circuit switched channel to a target destination that corresponds to the second target destination identifier;
- maintaining the RF-based circuit switched channel until at least the session conclusion indicator as corresponds to the message type has been detected; and
- transmitting the data packets via the RF-based circuit switched channel without either the first or second target destination identifiers being transmitted therewith.

6. The method of claim 5 wherein the step of formatting the plurality of data packets into at least one session, which session includes the session conclusion indicator, includes the step of formatting the plurality of data packets into at least one session, which session includes the session conclusion indicator that comprises a maximum number of data packets that can be transmitted in a single session, such that transmission of less than the maximum number indicates conclusion of the session.

7. The method of claim 4 wherein the step of formatting the plurality of data packets into at least one session, which session includes the session conclusion indicator, includes the step of positioning the session conclusion indicator as an initial data packet in the at least one session.

8. The method of claim 4 wherein the step of formatting the plurality of data packets into at least one session, which session includes the session conclusion indicator, includes the step of positioning the session conclusion indicator as a concluding data packet in the at least one session.

9. The method of claim 4 wherein the step of maintaining the RF-based circuit switched channel until at least the session conclusion indicator as corresponds to the message type has been detected includes the step of discontinuing the RF-based circuit switched channel when the session conclusion indicator is detected.

10. A method comprising the steps of: at a target destination:
- establishing an RF-based circuit switched channel;
- receiving data packets via the RF-based circuit switched channel; and
- subsequent to reception of the data packets, combining each of the data packets with a first target destination identifier as corresponds to the target destination.

11. The method of claim 10 wherein the step of establishing the RF-based circuit switched channel includes the step of establishing the RF-based circuit switched channel based on a second target destination identifier as corresponds to the target destination.

12. The method of claim 10 wherein the step of receiving the data packets includes the step of receiving a session conclusion indicator, wherein the data packets comprise at least one session that includes the session conclusion indicator, and wherein the session conclusion indicator comprises a maximum number of data packets that can be transmitted in a single session, such that transmission of less than the maximum number indicates conclusion of the session.

* * * * *